US009579727B2

(12) United States Patent
Kaufmann et al.

(10) Patent No.: US 9,579,727 B2
(45) Date of Patent: Feb. 28, 2017

(54) CUTTING ASSEMBLY WITH CUTTING INSERT HAVING ENHANCED COOLANT DELIVERY

(71) Applicant: Kennametal Inc., Latrobe, PA (US)

(72) Inventors: Igor Kaufmann, Nürnberg (DE); Scott W. Lebo, Ligonier, PA (US)

(73) Assignee: KENNAMETAL INC., Latrobe, PA (US)

(*) Notice: Subject to any disclaimer, the term of this patent is extended or adjusted under 35 U.S.C. 154(b) by 197 days.

(21) Appl. No.: 14/289,116

(22) Filed: May 28, 2014

(65) Prior Publication Data
US 2015/0343534 A1    Dec. 3, 2015

(51) Int. Cl.
B23B 27/10    (2006.01)
B23B 27/04    (2006.01)
B23B 29/04    (2006.01)

(52) U.S. Cl.
CPC ............ *B23B 27/10* (2013.01); *B23B 27/045* (2013.01); *B23B 29/043* (2013.01); *B23B 2200/081* (2013.01); *B23B 2200/086* (2013.01); *B23B 2200/202* (2013.01); *B23B 2200/321* (2013.01); *B23B 2250/12* (2013.01); *Y10T 407/14* (2015.01)

(58) Field of Classification Search
CPC ..... B23B 27/10; B23B 2250/12; B23B 27/22; B23B 2200/086; B23C 5/28
See application file for complete search history.

(56) References Cited

U.S. PATENT DOCUMENTS

| | | |
|---|---|---|
| 383,103 A | 5/1888 | Cook |
| 1,707,903 A | 4/1929 | Charlton |
| 2,641,047 A | 6/1953 | Jackman |
| 3,785,021 A | 1/1974 | Norgren |
| 3,894,322 A | 7/1975 | Pano |
| 4,195,956 A | 4/1980 | Mihic |
| 4,230,428 A | 10/1980 | Haug |
| 4,417,833 A | 11/1983 | Wertheimer |
| 4,580,930 A | 4/1986 | Zinner |
| 4,621,547 A | 11/1986 | Yankoff |
| 4,645,385 A | 2/1987 | Keller |

(Continued)

FOREIGN PATENT DOCUMENTS

| | | |
|---|---|---|
| AT | 4597 U1 | 9/2001 |
| AT | 6939 U1 | 6/2004 |

(Continued)

OTHER PUBLICATIONS

Machine translation of JP2004-209615.

(Continued)

*Primary Examiner* — Will Fridie, Jr.
(74) *Attorney, Agent, or Firm* — Ian K. Samways (57) ABSTRACT

A cutting assembly includes toolholder and a cutting insert. The cutting insert includes a top surface, a rake face and a cutting edge. The top surface includes a coolant duct along a central, longitudinal axis, A, that directs coolant from an inlet region to a cutting region. The cutting region includes a pair of chip deflectors and a plurality of coolant directing elements separating a plurality of coolant channels configured in at least one hub and spoke arrangement that directs coolant radially outward from the central, longitudinal axis, A, to the entire cutting edge of the cutting insert.

20 Claims, 9 Drawing Sheets

(56) References Cited

U.S. PATENT DOCUMENTS

| | | |
|---|---|---|
| 4,955,264 A | 9/1990 | Armbrust |
| 5,022,795 A | 6/1991 | Stampfli |
| 5,035,545 A | 7/1991 | Zinner |
| 5,076,738 A | 12/1991 | Pano |
| 5,085,541 A | 2/1992 | Simpson, III |
| 5,112,164 A | 5/1992 | Pano |
| 5,139,371 A | 8/1992 | Kraft et al. |
| 5,150,992 A | 9/1992 | Friedmann |
| 5,161,920 A | 11/1992 | Zinner |
| 5,375,948 A | 12/1994 | Lindstedt |
| 5,411,354 A | 5/1995 | Gustafsson |
| 5,439,327 A | 8/1995 | Werthiem |
| 5,743,680 A | 4/1998 | von Haas |
| 5,803,675 A | 9/1998 | Von Haas |
| 5,829,924 A | 11/1998 | Oshnock et al. |
| 5,921,724 A | 7/1999 | Erickson et al. |
| 5,934,843 A | 8/1999 | Brask et al. |
| 5,980,165 A | 11/1999 | Hansson |
| 6,116,823 A | 9/2000 | Mihic |
| 6,176,649 B1 | 1/2001 | Friedman |
| 6,234,727 B1 | 5/2001 | Barazani |
| 6,241,429 B1 | 6/2001 | Schafer et al. |
| 6,244,790 B1 | 6/2001 | Kingdom |
| 6,261,032 B1 | 7/2001 | Duwe |
| 6,299,388 B1 | 10/2001 | Slabe |
| 6,572,309 B2 | 6/2003 | Hansson et al. |
| 6,579,044 B1 | 6/2003 | Trenkwalder et al. |
| 7,104,171 B1 | 9/2006 | Long |
| 7,121,771 B2 | 10/2006 | Englund |
| 7,275,896 B2 | 10/2007 | Nudelman |
| 7,300,232 B2 | 11/2007 | Wiman et al. |
| 7,320,564 B2 | 1/2008 | Gati |
| 7,488,142 B2 | 2/2009 | Englund et al. |
| 7,578,639 B2 | 8/2009 | Wiman et al. |
| 7,665,933 B2 | 2/2010 | Nagaya et al. |
| 7,887,266 B2 | 2/2011 | Hecht |
| 7,887,267 B2 | 2/2011 | Niemi et al. |
| 7,896,585 B2 | 3/2011 | Hecht |
| 8,021,084 B2 | 9/2011 | Hecht |
| 8,647,029 B2 | 2/2014 | Hecht |
| 8,827,598 B2 * | 9/2014 | Henry .................... B23B 27/04 407/11 |
| 8,939,684 B2 | 1/2015 | Chistyakov |
| 8,985,913 B2 * | 3/2015 | Oren .................... B23B 29/043 407/107 |
| 9,168,588 B2 * | 10/2015 | Kaufmann ............ B23B 27/045 |
| 9,242,300 B2 * | 1/2016 | Kaufmann .......... B23B 27/1666 |
| 2002/0081165 A1 | 6/2002 | Hecht |
| 2003/0165362 A1 | 9/2003 | Hecht |
| 2004/0151551 A1 | 8/2004 | Oettle |
| 2005/0207854 A1 | 9/2005 | Hecht |
| 2005/0232712 A1 | 10/2005 | Hecht |
| 2005/0238444 A1 | 10/2005 | Virtanen et al. |
| 2006/0269367 A1 | 11/2006 | Havrda |
| 2008/0193231 A1 | 8/2008 | Jonsson |
| 2008/0240874 A1 | 10/2008 | Nagaya |
| 2009/0214305 A1 | 8/2009 | Waggle |
| 2011/0299944 A1 | 12/2011 | Hofermann |
| 2013/0051934 A1 | 2/2013 | Henry |
| 2013/0058729 A1 * | 3/2013 | Choi .................... B23B 27/045 407/107 |
| 2013/0183109 A1 | 7/2013 | Fujii |
| 2013/0202372 A1 * | 8/2013 | Hecht .................... B23B 27/10 407/107 |
| 2013/0236256 A1 * | 9/2013 | Kaufmann ............ B23B 27/04 407/107 |
| 2014/0126969 A1 | 5/2014 | Tornstrom |
| 2014/0147219 A1 | 5/2014 | Kaufmann et al. |
| 2014/0161547 A1 | 6/2014 | Kaufmann et al. |
| 2014/0321926 A1 * | 10/2014 | Sadikov ................. B23B 27/10 407/11 |
| 2014/0321929 A1 | 10/2014 | Bhagath |
| 2015/0075338 A1 | 3/2015 | Onodera |
| 2015/0343534 A1 * | 12/2015 | Kaufmann .............. B23B 27/10 407/11 |

FOREIGN PATENT DOCUMENTS

| | | |
|---|---|---|
| CN | 1166148 A | 11/1997 |
| CN | 101743084 A | 6/2010 |
| CN | 201572931 U | 9/2010 |
| CN | 201572932 U | 9/2010 |
| DE | 1002587 B | 2/1957 |
| DE | 3319799 A1 | 12/1984 |
| DE | 3906822 A1 | 9/1990 |
| DE | 8214831 U1 | 6/1991 |
| DE | 4322082 A1 | 1/1995 |
| DE | 19739855 A1 | 4/1999 |
| DE | 19848371 A1 | 5/2000 |
| DE | 69608965 T2 | 12/2000 |
| DE | 69906702 T2 | 2/2004 |
| DE | 102004033929 B3 | 1/2006 |
| DE | 202006011535 U1 | 11/2006 |
| DE | 102006055255 A1 | 6/2008 |
| DE | 19955581 B4 | 11/2008 |
| DE | 102008005788 B3 | 7/2009 |
| DE | 102012002395 A1 | 9/2012 |
| DE | 102011053760 A1 | 3/2013 |
| DE | 102012017424 A1 | 3/2014 |
| EP | 0312223 B1 | 8/1992 |
| EP | 851796 B1 | 6/2000 |
| EP | 865851 B1 | 9/2000 |
| EP | 1188503 B1 | 2/2005 |
| EP | 654316 B2 | 10/2005 |
| EP | 1205273 B1 | 9/2006 |
| EP | 2082820 A2 | 7/2009 |
| EP | 2176021 B1 | 12/2010 |
| EP | 2394763 A1 | 12/2011 |
| JP | S601706 A | 1/1985 |
| JP | 0871810 | 3/1996 |
| JP | 2000158271 A | 6/2000 |
| JP | 2001138106 A | 5/2001 |
| JP | 2004209615 A | 7/2004 |
| WO | WO9710911 | 3/1997 |
| WO | WO9912680 A1 | 3/1999 |
| WO | WO9930859 A1 | 6/1999 |
| WO | WO0119557 | 9/2001 |
| WO | 2009141815 A1 | 11/2009 |
| WO | 2010096014 A1 | 8/2010 |
| WO | 2011080734 A1 | 7/2011 |
| WO | WO2011087180 A1 | 7/2011 |
| WO | WO2011128888 A1 | 10/2011 |
| WO | WO2014003161 A1 | 1/2014 |

OTHER PUBLICATIONS

Machine translation of JPH08-071810.
Mar. 15, 2016-First_CN_Office_Action_and_EN_Translation-K-4102-CN-NP_2013100648518.
K-04102-US-NP Non-Final Rejection.
May 15, 2015 Final Office Action 20130236256.
May 22, 2015 Office action (3 months) 1 US 2014-0147219 A1.
Jul. 10, 2015 Notice of Allowance US 2014-0147219 A1.
Jul. 15, 2015 Office action (3 months) 1 US 2014-0161547 A1.
Sep. 23, 2015 Office action (3 months) 2 20130236256.
Oct. 1, 2015 Notice of Allowance US 2014-0161547 A1.
DE 102012004804, Jan. 19, 2016 Opposition DE 102012004804.
Feb. 16, 2016 Notice of Allowance K-04102-US-NP.

* cited by examiner

CUTTING ASSEMBLY WITH CUTTING INSERT HAVING ENHANCED COOLANT DELIVERY

BACKGROUND OF THE INVENTION

The invention pertains to a cutting assembly for removing material from a workpiece. More specifically, the invention pertains to such a cutting assembly that includes a toolholder, which carries a cutting insert, wherein the toolholder provides the capability to supply coolant to the cutting insert.

In a cutting operation, such as, for example, a grooving operation, a grooving or cutting insert engages a workpiece so as to remove material from the workpiece. In some cutting assemblies, an upper seat and a lower seat retain the cutting insert. Exemplary cutting assemblies wherein an upper seat and a lower seat retain a cutting insert are shown in U.S. Pat. No. 6,261,032 and PCT Patent Application Publication WO 2009/141815 A1.

Material removal operations can generate heat at the interface between the cutting insert and the workpiece. Typically, it is advantageous to provide coolant to the vicinity of the interface between the cutting insert and the workpiece. The following patent documents are exemplary of arrangements that delivery coolant to the vicinity of a cutting insert: U.S. Pat. Nos. 5,439,327; 5,775,854; 6,705,805; and 7,641,422.

Even though the arrangements disclosed in some of the above patent documents deliver coolant, it remains highly desirable to provide a cutting assembly that delivers in an efficient fashion coolant to the interface between the cutting insert and the workpiece. This is especially true for a cutting operation in which the cutting insert engages the workpiece surface at the outside diameter (i.e., outside workpiece surface) for the purpose of cutting a groove. During the cutting operation, as the depth of the groove increases, the difficulty connected with coolant delivery to the cutting insert-workpiece interface increases. As can be appreciated, it would very beneficial to provide a cutting assembly (and especially a toolholder) that delivers coolant to the cutting insert-workpiece interface even as the depth of the groove increases during the cutting operation.

SUMMARY OF THE INVENTION

The inventors have solved the problem of delivering coolant to the cutting insert-workpiece interface by providing a cutting region that includes a pair of chip deflectors and a plurality of coolant directing elements for directing coolant in at least one "hub and spoke" arrangement such that coolant is delivered to an entire cutting edge of the cutting insert.

In one aspect, a cutting insert comprises a top surface including a coolant duct along a central, longitudinal axis, A, that directs coolant from an inlet region to a cutting region, the cutting region including a pair of chip deflectors and a plurality of coolant directing elements separating a plurality of coolant channels configured in at least one hub and spoke arrangement that directs coolant radially outward from the central, longitudinal axis, A, to the entire cutting edge of the cutting insert.

In another aspect, the invention is a cutting assembly comprising a toolholder and a cutting insert. The toolholder has an axial forward end and an axial rearward end, the toolholder having a head portion at the axial forward end and a shank portion at the axial rearward end. The head portion contains a slot separating the head portion into a lower section and an upper section, the lower section defining a lower seat and the upper section adapted to retain the cutting insert therebetween. The head portion contains a coolant delivery passage having an exit adapted to direct coolant to the cutting insert. The cutting insert includes a top surface including a coolant duct along a central, longitudinal axis, A, that directs coolant from an inlet region to a cutting region, the cutting region including a pair of chip deflectors and a plurality of coolant directing elements separating a plurality of coolant channels configured in at least one hub and spoke arrangement that directs coolant radially outward from the central, longitudinal axis, A, to the entire cutting edge of the cutting insert.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Referring to the drawings wherein like reference characters designate like elements there is shown a cutting assembly generally designated as 20. The specific kind of cutting assembly 20 illustrated is a grooving assembly. The illustration of a grooving assembly is not intended to restrict the scope of the invention. Further, the mention of the cutting assembly and cutting insert as a grooving assembly and grooving insert is not intended to restrict the scope of the invention. The kinds of cutting assemblies to which the invention relates includes, without limitation, a turning assembly, a cut-off tool assembly, and a face grooving assembly. The true scope and spirit of the invention is indicated by the claims hereof.

Figure 7:
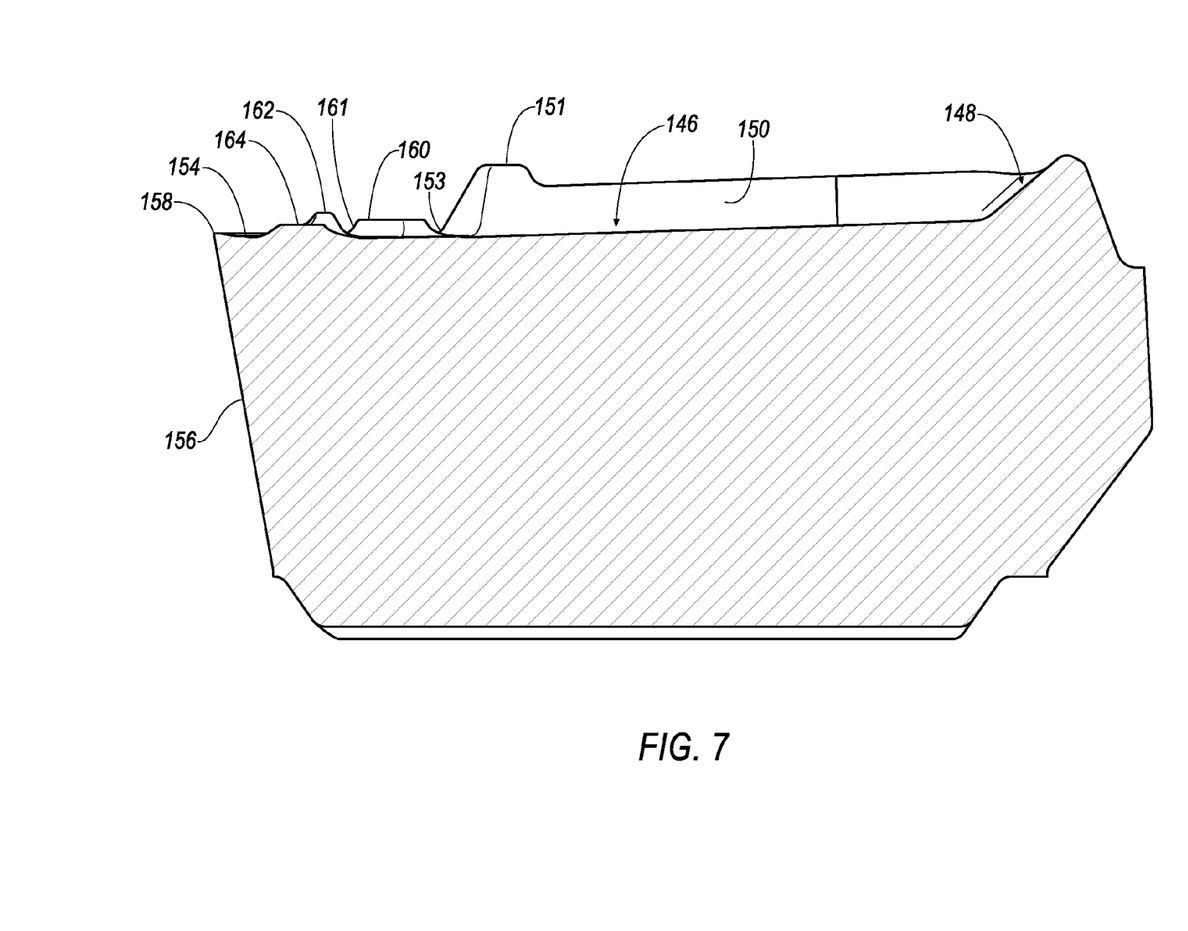
FIG. 7 is a cross-sectional view of the cutting insert of FIG. 5 taken along line 8-8 of FIG. 6.

Cutting (or grooving) assembly 20 comprises a toolholder 22 and a cutting insert (or grooving insert) 24. As shown in FIG. 7, the cutting insert 24 has a central longitudinal cutting insert axis A-A. The cutting insert 24 is secured in the toolholder 22 such that the central longitudinal cutting insert axis A-A is generally perpendicular to the workpiece surface (not shown). The toolholder 22 has an axial forward end 28 and an axial rearward end 30. The toolholder 22 has a shank portion 32 at the axial rearward end 30 and a head portion 34 at the axial forward end 28.

The head portion 34 contains a slot 36. The slot 36 divides the head portion 34 into an upper section (see bracket 40) and a lower section (see bracket 42). The head portion 34 has a narrow (or thin) axial forward extension 44, which has a central longitudinal extension axis B-B (see FIG. 1). The narrow axial forward extension 44 forms a lower axial forward extension 44A and an upper axial forward extension 44B. The slot 36 separates the lower axial forward extension 44A and the upper axial forward extension 44B so they are movable relative to one another. The upper section 40 (in the form of the upper axial forward extension 44B) has an upper seat 46 in the vicinity of the axial forward extension 44. The lower section 42 (in the form of the lower axial forward extension 44A) has a lower seat 48 in the vicinity of the axial forward extension 44. The upper seat 46 and the lower seat 48 comprise a seating region generally designated as 50.

As will be described hereinafter, the coolant is delivered to the vicinity of the cutting insert-workpiece interface by discharging coolant from an opening in the narrow axial forward extension 44 of the head portion 34. Advantages result from discharging coolant directly at the cutting insert-workpiece interface throughout the entire cutting operation.

Figure 4:
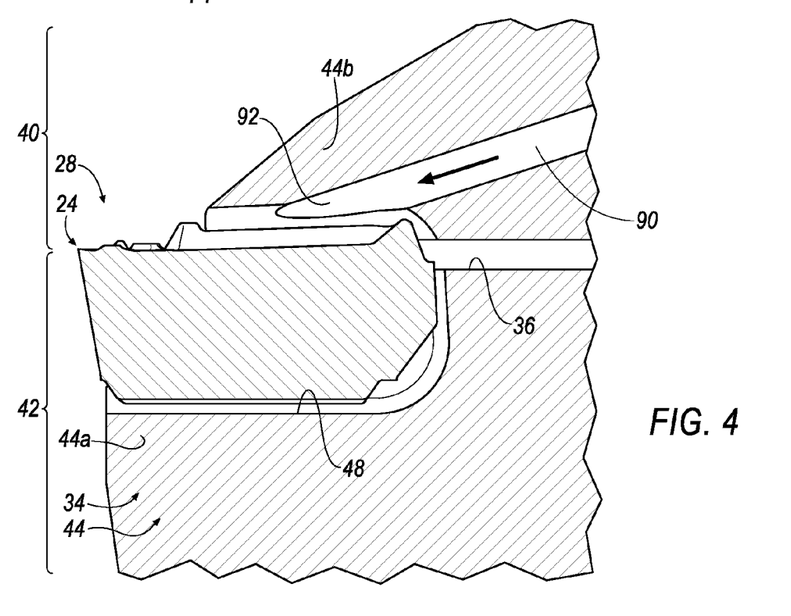
FIG. 4 is cross-sectional view of the head portion of the toolholder of FIG. 1 taken along line 4-4 of FIG. 2.

Referring to FIG. 4, the upper section 40 of the head portion 34 contains a coolant delivery passage 90, which terminates at a discharge opening (or exit) 92. The coolant deliver passage 90 is in fluid communication with a coolant supply (not shown) of a type well-known in the art that provides coolant under pressure to the coolant delivery passage 90. Coolant discharges from the discharge opening 92 toward the cutting insert-workpiece interface from a position (or location) that is above the cutting insert-workpiece interface.

There should be an appreciation that the coolant discharges from the discharge opening 92 in a direction directly toward the cutting insert 24. Keeping in mind that the cutting insert 24 is elongate with a central longitudinal axis, A, the coolant discharges the discharge opening 92 in a direction generally aligned with the central longitudinal axis, A, of the elongate cutting insert 24 throughout the entire cutting operation. As will be discussed hereinafter, certain advantages arise from the discharge of the coolant directly to the vicinity of the cutting insert-workpiece interface throughout the entire cutting operation.

Figure 1:
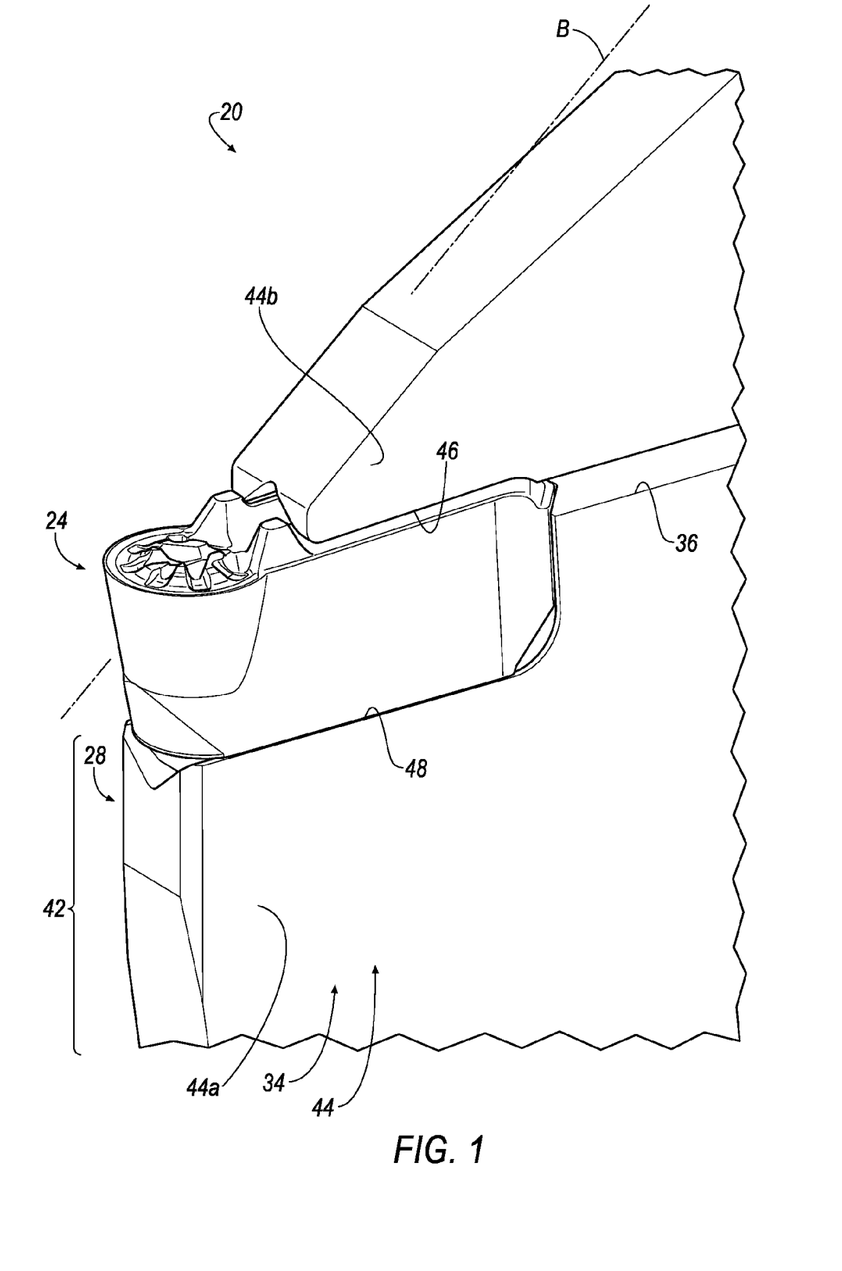
FIG. 1 is an isometric view of the cutting assembly, which has the toolholder and a cutting insert retained by the toolholder.
Figure 2:
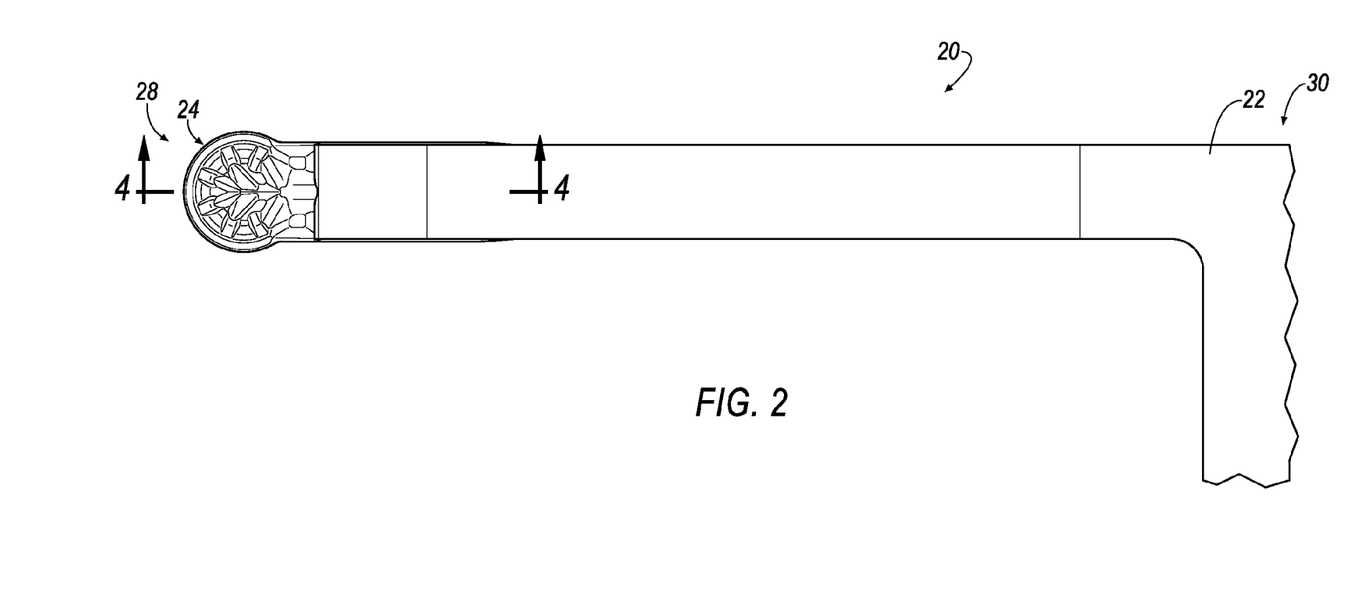
FIG. 2 is a top view of the head portion of the toolholder of FIG. 1.
Figure 3:
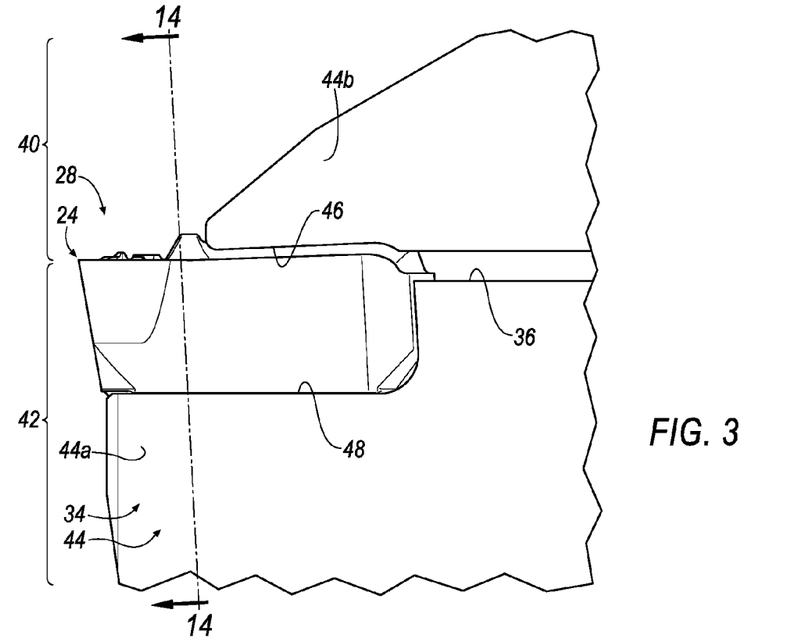
FIG. 3 is cross-sectional view of the head portion of the toolholder of FIG. 1 taken along line 3-3 of FIG. 2.

Referring to FIGS. 5-14, the cutting insert 24 for mounting on the tool holder 22 is shown according to an embodiment of the invention. The cutting insert 24 can be divided into two regions: an insertion region 140 for mounting the cutting insert in the cutting assembly 20 and a cutting region 142, with which the workpiece to be machined (not shown) can be machined. During use, the insertion region 140 of the cutting insert 24 is clamped to the toolholder 22, as shown in FIG. 1, which locates and supports the cutting region 142. It will be appreciated that the invention is not limited by the single cutting region 142, and that the cutting insert 24 can have a pair of cutting regions 142 disposed on each end of the cutting insert 24 such that, when one of the cutting regions 142 is worn, the cutting insert 24 can be rotated 180° in the toolholder 22 in order to locate the other cutting region 142 at the machining position.

In one embodiment, the cutting insert 24 is formed from a relatively hard material, such as carbide, cermet, ceramic, and the like. The cutting insert 24 can be molded using powder metal technology that is known in the art. However, the invention contemplates other methods and technologies for forming and making the cutting insert, as well as materials other than those identified above.

Figure 5:
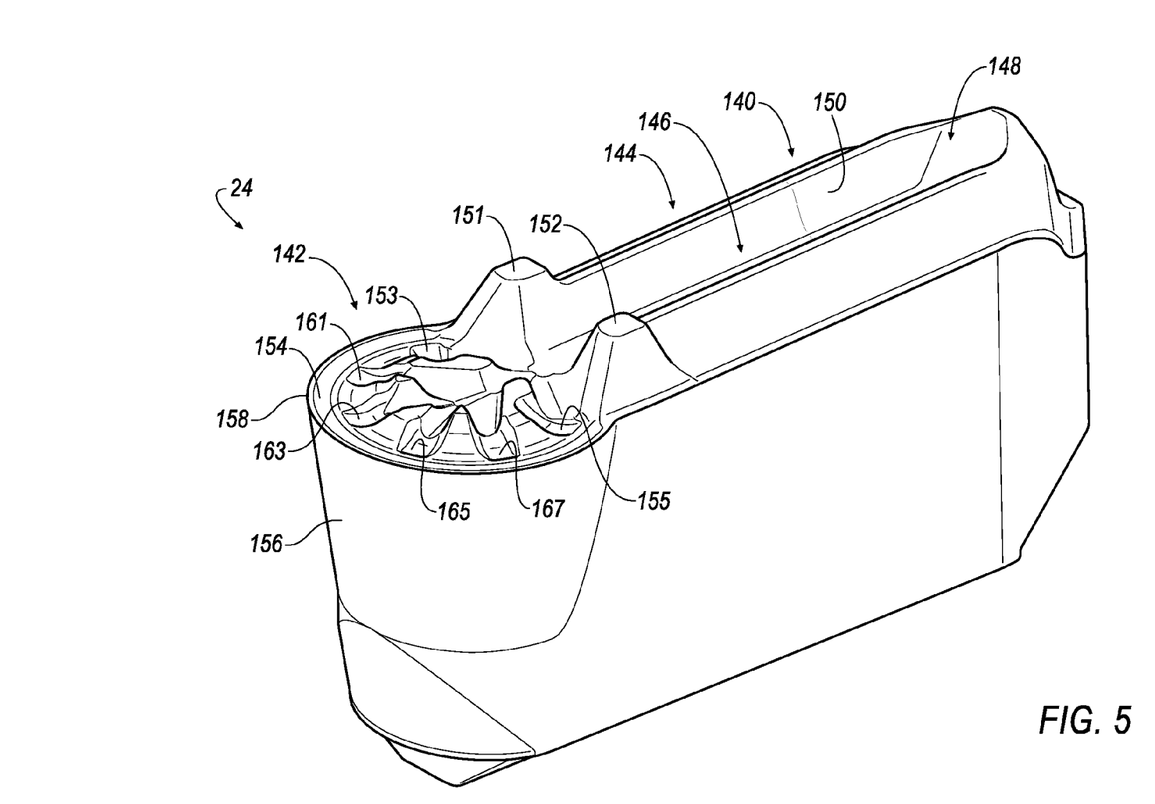
FIG. 5 is an isometric view of the cutting insert according to an embodiment of the invention.
Figure 6:
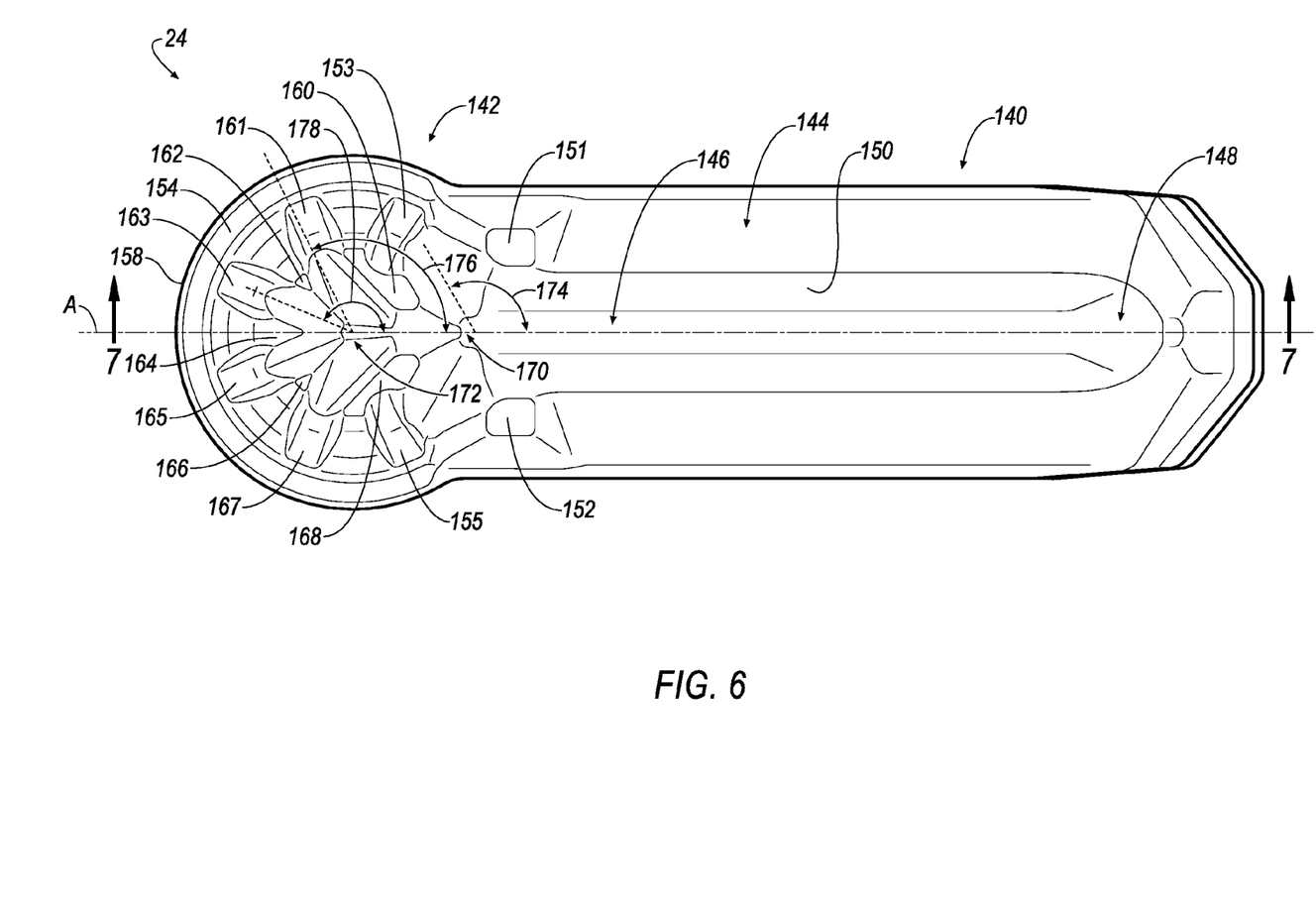
FIG. 6 is a top view of the cutting insert of FIG. 5.

A top surface 144 of the cutting insert 24 includes a coolant duct 146 that substantially extends over the entire length of the cutting insert 24. An inlet region 148 of the coolant duct 146 is located in the insertion region 140 and extends along and parallel with a central axis A of the cutting insert 24. The inlet region 148 is surrounded by a U-shaped duct wall 150, which is open toward the cutting region 142.

Chip deflectors 151, 152 are located at the end of the U-shaped duct wall 150 within the cutting region 142 proximate the insertion region 140. The coolant duct 146 extends and opens conically in the region between the chip deflectors 152. A rake face 154 is formed in the cutting region 142 proximate a circumferential end face 156 of the cutting insert 24. A main cutting edge 158 is formed at the intersection of the rake face 154 and the circumferential end face 156. In the illustrated embodiment, the main cutting edge 158 is round or circular in shape. However, it will be appreciated that the invention is not limited by the shape of the main cutting edge 158, and that the invention can be practiced with the main cutting edge 158 having any desirable shape. For example, the cutting insert 24 may be generally rectangular in shape with the cutting region having two opposing side faces and two secondary cutting edges formed at the intersection between the rake face and each of the opposing side faces. In this alternate embodiment, the main cutting edge forms approximately a right angle with each of the two secondary cutting edges.

One aspect of the invention is that the cutting region 142 includes a plurality of coolant directing elements 160, 162, 164, 166, 168 separating a plurality of coolant channels 153, 155, 161, 163, 165, 167. In the illustrated embodiment, the cutting region 142 includes a total of five (5) directing elements and six (6) coolant channels. However, it will be appreciated that the invention is not limited by the number of directing elements and coolant channels, and that the invention can be practiced with any desirable number of directing elements and coolant channels, so long as adequate cooling is providing to the cutting edge 158.

In general, the coolant channel 153 is formed between the chip deflector 151 and the directing element 160, the coolant channel 155 is formed between the chip deflector 152 and the directing element 168, the coolant channel 161 is formed between the directing elements 160, 162, the coolant channel 163 is formed between the directing elements 162, 164, and the coolant channel 165 is formed between the directing elements 164, 166, the coolant channel 167 is formed between the directing elements 166, 168.

The coolant channels 153, 155, 161, 163, 165, 167 are generally in the form of a U-shaped depression. In addition, some of the coolant channels 153, 155, 161, 163, 165, 167 may have a varying cross-sectional area along its length (i.e. conical in shape). In the illustrated embodiment, for example, the coolant channels 161, 167 have a slightly larger cross-sectional area proximate the coolant duct 146 and the coolant channels 153, 155, 163, 165 may have a substantially uniform cross-sectional area. In another example, the coolant channels 163, 165 may have a varying cross-sectional area, while coolant channels 153, 155, 161, 167 are substantially uniform cross-sectional area. In yet another example, the coolant channels 153, 155 may have a varying cross-sectional area, while coolant channels 161, 163, 165, 167 have a substantially uniform cross-sectional area. It will be appreciated that other combinations of coolant channels with varying cross-sectional areas and uniform cross-sectional areas are within the scope of the invention.

In general, the coolant duct 146 in combination with the coolant channels 153, 155, 161, 163, 165, 167 form a "hub and spoke" arrangement. As used herein, the "hub" is a region that divides the coolant from the coolant duct 146 into a plurality of "spokes," and the "spoke" is a coolant channel that directs coolant in a radially outward direction from the "hub". In the illustrated embodiment, the cutting insert 24 has a plurality of "hub and spoke" arrangements. One arrangement comprises a first hub region 170 of the coolant duct 146 as the "hub" and the coolant channels 153, 155 as the "spokes", and a second arrangement comprises a second hub region 172 of the coolant duct 146 as the "hub" and the coolant channels 161, 163, 165, 167 as the "spokes". In the illustrated embodiment, both hub regions 170, 172 are in series and lie along the central, longitudinal axis, A, of the cutting insert 24. It will be appreciated that the invention is not limited by the number of "hub and spoke" arrangements, and that the invention can be practiced with any number of the "hub and spoke" arrangements to provide adequate cooling to the cutting edge 158.

The coolant channels 153, 155 form an angle 174 with respect to the central, longitudinal axis, A, of the cutting insert 24. The angle 174 can be between 90 degrees and 180 degrees. In the illustrated embodiment, the angle 174 is about 135 degrees. It is noted that the coolant channels 153, 155 direct coolant in a direction that is non-perpendicular to the cutting edge 158.

Similar to the coolant channels 153, 155, the coolant channels 161, 167 form an angle 176 with respect to the central, longitudinal axis, A, of the cutting insert 24. The angle 176 can be between 90 degrees and 180 degrees. In the illustrated embodiment, the angle 176 is about 135 degrees, which is substantially identical to the angle 174 defined by the coolant channels 153, 155. However, the angle 176 can be different than the angle 174, depending on the geometry of the cutting region 142 of the cutting insert 24. It is noted that the coolant channels 161, 167 direct coolant in a direction that is substantially perpendicular to the cutting edge 158, unlike the coolant channels 153, 155.

The coolant channels 163, 165 form an angle 178 with respect to the central, longitudinal axis, A, of the cutting insert 24. The angle 178 can be between 90 degrees and 180 degrees. In the illustrated embodiment, the angle 176 is about 165 degrees, which is larger than the angle 174 defined by the coolant channels 161, 167. Similar to the coolant channels 161, 167, the coolant channels 161, 167 direct coolant in a direction that is substantially perpendicular to the cutting edge 158.

Figure 14:
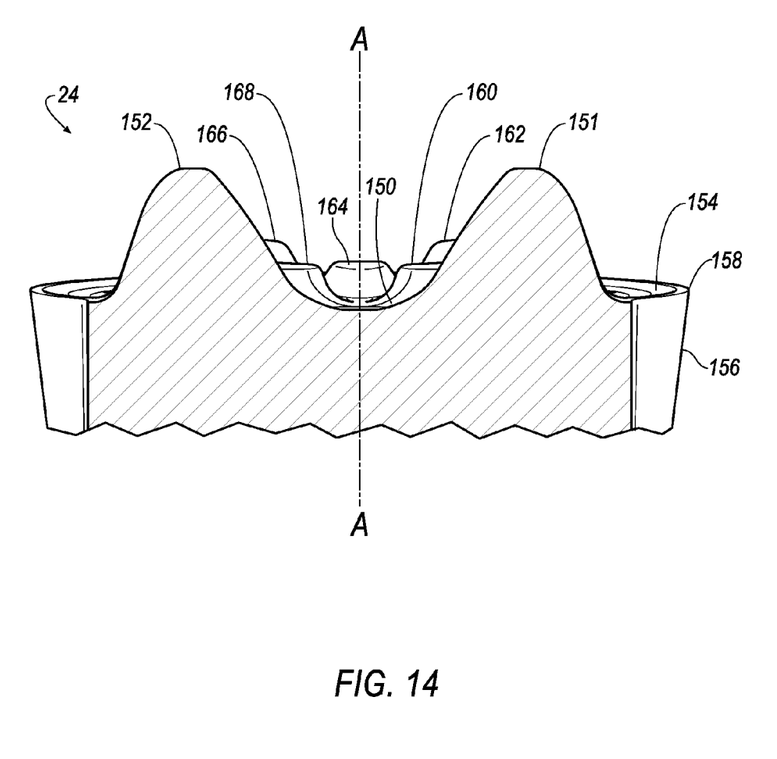
FIG. 14 is a cross-sectional view of the cutting insert of FIG. 5 taken along section line 14-14 of FIG. 3.

As mentioned above, the coolant directing elements 160, 162, 164, 166, 168 cause the coolant to be directed along the coolant channels 153, 155, 161, 163, 165, 167. In the illustrated embodiment, the coolant directing elements 160, 162, 166, 168 are located symmetrical on each side of the central, longitudinal axis, A, of the cutting insert (24), while the directing element 164 lies directly along the central, longitudinal axis, A, of the cutting insert 24, as shown in FIG. 14. In addition, the coolant directing elements 160, 168 are closer to the central, longitudinal axis, A, of the cutting insert 24 than the coolant directing elements 162, 166, while the coolant directing element 164 is lies along the central, longitudinal axis, A.

Figure 8:
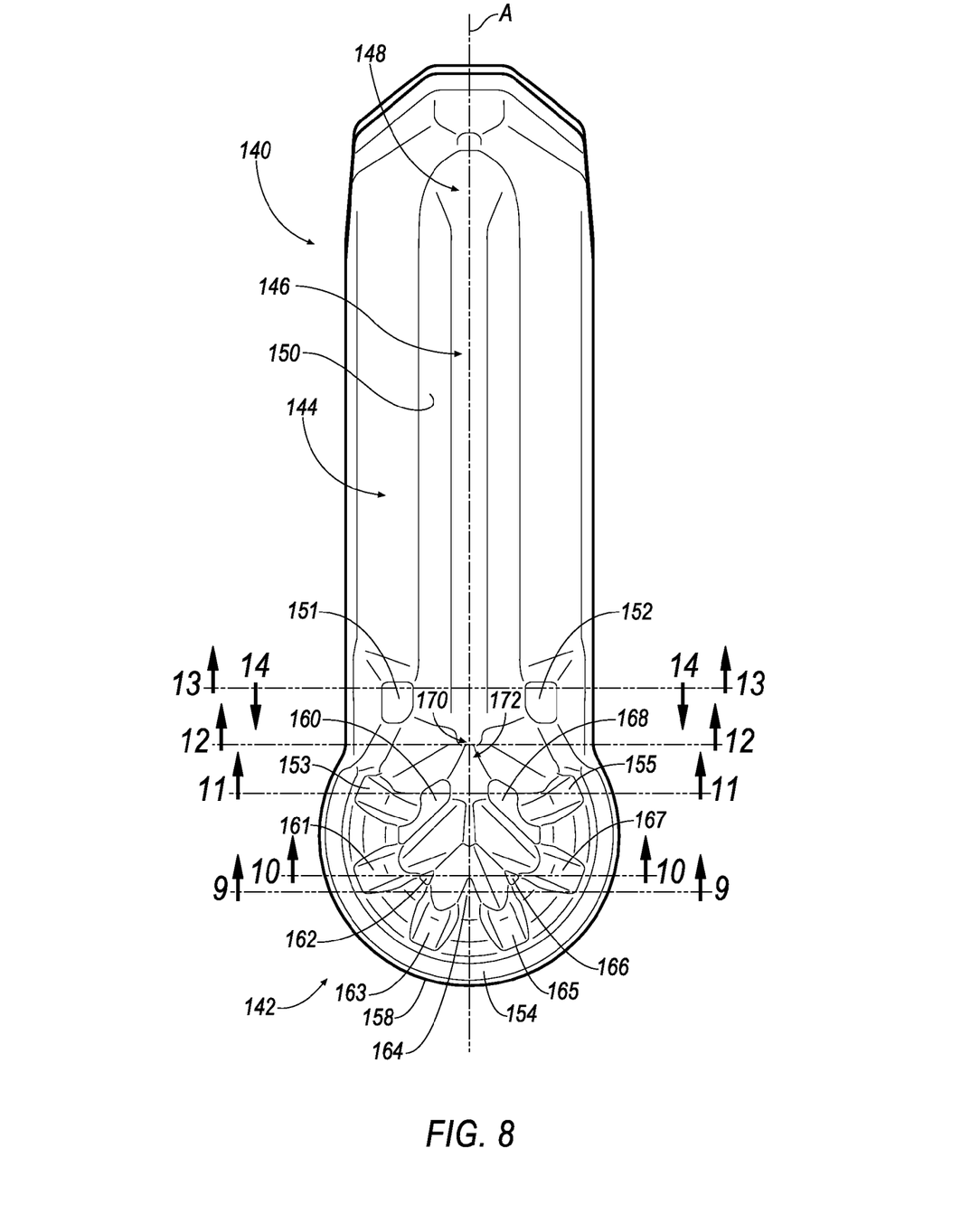
FIG. 8 is another top view of the cutting insert.
Figure 9:
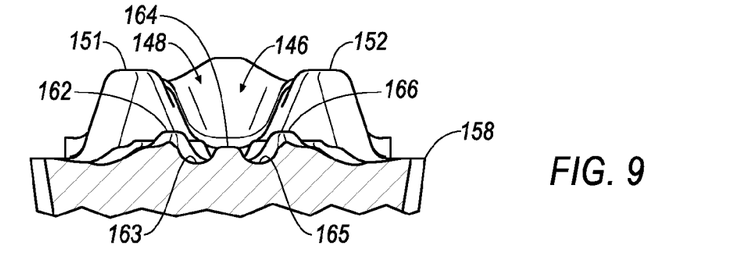
FIG. 9 is a cross-sectional view of the cutting insert of FIG. 5 taken along section line 10-10 of FIG. 8.
Figure 10:
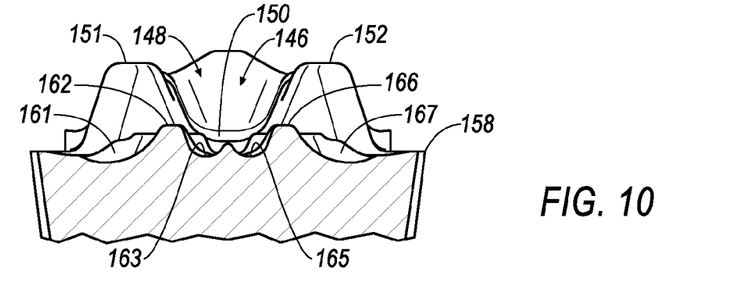
FIG. 10 is a cross-sectional view of the cutting insert of FIG. 5 taken along section line 11-11 of FIG. 8.
Figure 11:
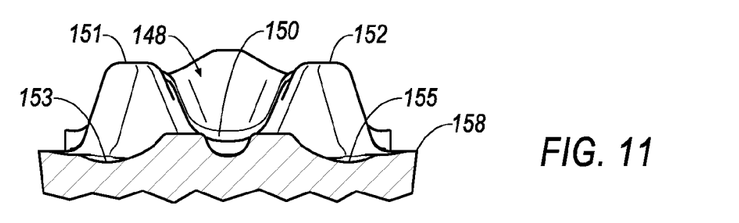
FIG. 11 is a cross-sectional view of the cutting insert of FIG. 5 taken along section line 12-12 of FIG. 8.
Figure 12:
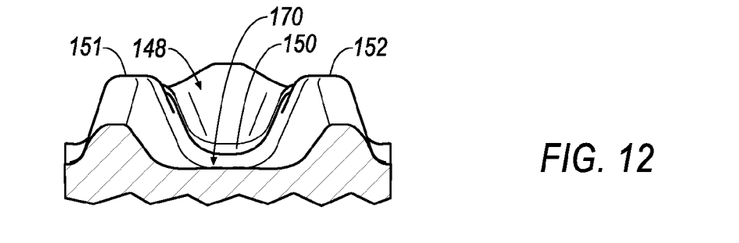
FIG. 12 is a cross-sectional view of the cutting insert of FIG. 5 taken along section line 13-13 of FIG. 8.
Figure 13:
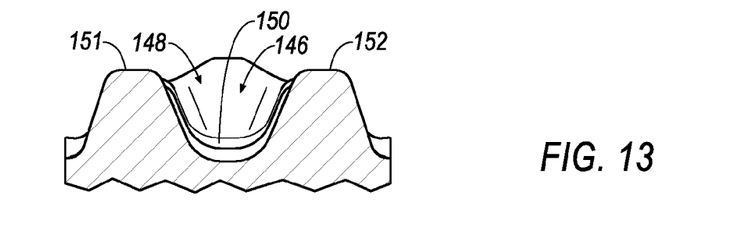
FIG. 13 is a cross-sectional view of the cutting insert of FIG. 5 taken along section line 13-13 of FIG. 8.

Further, the directing elements 160, 162, 164, 166, 168 have different heights above the cutting edge 154. For example, the coolant directing elements 160, 168 proximate the chip deflectors 151, 152 are lower in elevation than the coolant directing elements 162, 166 proximate the rake face 154, as shown in FIG. 8. In addition, the coolant directing element 164 that lies along the central, longitudinal axis, A, is lower in elevation than all the other coolant directing elements 160, 162, 166, 168. In other words, the coolant directing elements 162, 166 proximate the rake face 154 are highest in elevation with respect to the cutting edge 154. This configuration has been shown to provide optimum coolant delivery to the cutting insert-workpiece interface.

During the entire cutting operation, it is important to deliver coolant to the cutting insert-workpiece interface. By the nature of the cutting operation that forms a groove, as the cutting operation progresses the cutting insert, which has an elongate geometry with a central longitudinal axis perpendicular to the surface of the workpiece, moves deeper into the workpiece. Further, as the cutting operation progresses, the cutting insert-workpiece interface moves deeper into the mass of the workpiece. As a result, it becomes more difficult to deliver coolant from an external side nozzle to the cutting insert-workpiece interface because the workpiece itself blocks coolant from reaching the cutting insert-workpiece interface.

The problem of delivering coolant to the cutting insert-workpiece interface has been solved by the invention by providing one or more "hub and spoke" arrangements of coolant directing elements 160, 162, 164, 166, 168 and coolant channels 153, 155, 161, 163, 165, 167 in the cutting region 142 of the cutting insert 24. In the illustrated embodiment, one "hub" comprising a first hub region 170 in which the coolant splits into a plurality of separate and distinct coolant channels 153, 155, and a second "hub" comprising a second hub region 172 in which the coolant again splits into a plurality of separate and distinct coolant channels 161, 163, 165, 167. The plurality of coolant channels 153, 155, 161, 163, 165, 167 direct coolant to the entire cutting edge 24.

Overall, it is apparent from the above description in connection with the drawings that the cutting assembly delivers coolant in an efficient fashion to the vicinity of the interface between the cutting insert and the workpiece.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A cutting insert comprising a top surface including a coolant duct along a central, longitudinal axis that directs coolant from an inlet region to a cutting region, the cutting region including a pair of chip deflectors and a plurality of coolant directing elements separating a plurality of coolant channels configured in at least one hub and spoke arrangement that directs coolant radially outwardly from the central, longitudinal axis to the entire cutting edge of the cutting insert.

2. The cutting insert according to claim 1, wherein the cutting region includes two hub and spoke arrangements, a first arrangement comprising a first hub region in which coolant splits into a first plurality of coolant channels, and a second arrangement comprising a second hub region in which coolant again splits into a second plurality of coolant channels.

3. The cutting insert according to claim 2, wherein the first and second arrangements are arranged in series along the central, longitudinal axis of the cutting insert.

4. The cutting insert according to claim 2, wherein at least one of the second plurality of coolant channels forms a first angle with respect to the central, longitudinal axis of the cutting insert, and wherein at least another one of the second plurality of coolant channels forms a second angle with respect to the central, longitudinal axis of the cutting insert, the second angle being larger than the first angle.

5. The cutting insert according to claim 1, wherein at least one of the coolant channels has a varying cross-sectional area along its length.

6. The cutting insert according to claim 1, wherein one of the coolant directing elements lies directly along the central, longitudinal axis of the cutting insert.

7. The cutting insert according to claim 1, wherein all the coolant directing elements are located symmetrically on each side of the central, longitudinal axis of the cutting insert, except one of the coolant directing elements that lies directly along the longitudinal axis of the cutting insert.

8. The cutting insert according to claim 1, wherein at least one of the coolant directing elements has a different height above the cutting edge of the cutting insert.

9. The cutting insert according to claim 8, wherein at least one of the coolant directing elements proximate the chip deflectors is lower in elevation than at least one of the coolant directing elements proximate a rake face of the cutting insert.

10. The cutting insert according to claim 8, wherein one of the coolant directing elements lies directly along the longitudinal axis of the cutting insert.

11. The cutting insert according to claim 10, wherein the one coolant directing element that lies directly along the longitudinal axis of the cutting insert is lower in elevation than all the other coolant directing elements.

12. The cutting insert according to claim 1, wherein the cutting edge is round or circular in shape.

13. The cutting insert according to claim 1, wherein at least one of the coolant directing elements is closer to the central, longitudinal axis than another one of the coolant directing elements.

14. A cutting assembly, comprising:
a toolholder and a cutting insert;
the toolholder having an axial forward end and an axial rearward end, the toolholder having a head portion at the axial forward end and a shank portion at the axial rearward end;
the head portion containing a slot separating the head portion into a lower section and an upper section, the lower section defining a lower seat and the upper section adapted to retain the cutting insert therebetween;
the head portion having a coolant exit adapted to direct coolant to the cutting insert;
the cutting insert including a top surface including a coolant duct along a central, longitudinal axis that directs coolant from an inlet region to a cutting region, the cutting region including a pair of chip deflectors and a plurality of coolant directing elements separating a plurality of coolant channels configured in at least one hub and spoke arrangement that directs coolant radially outwardly from the central, longitudinal axis to the entire cutting edge of the cutting insert.

15. The cutting assembly according to claim 14, wherein the cutting region includes two hub and spoke arrangements, a first arrangement comprising a first hub region in which coolant splits into a first plurality of coolant channels, and a second arrangement comprising a second hub region in which coolant again splits into a second plurality of coolant channels.

16. The cutting assembly according to claim 15, wherein at least one of the second plurality of coolant channels forms a first angle with respect to the central, longitudinal axis of the cutting insert, and wherein at least another one of the second plurality of coolant channels forms a second angle with respect to the central, longitudinal axis of the cutting insert, the second angle being larger than the first angle.

17. The cutting assembly according to claim 14, wherein the coolant directing elements are located symmetrically on each side of the central, longitudinal axis of the cutting insert, while one of the coolant directing elements lies directly along the longitudinal axis of the cutting insert.

18. The cutting assembly according to claim 14, wherein at least one of the coolant directing elements has a different height above the cutting edge of the cutting insert.

19. The cutting assembly according to claim 14, wherein at least one of the coolant directing elements proximate the chip deflectors is lower in elevation than at least one of the coolant directing elements proximate a rake face of the cutting insert.

20. The cutter assembly according to claim 14, wherein one of the directing elements lies directly along the longitudinal axis of the cutting insert and is lower in elevation than all the other coolant directing elements.

* * * * *